United States Patent [19]

Kleiss

[11] 4,341,831

[45] Jul. 27, 1982

[54] SHAPES FOR WINDOWS OR DOORS

[75] Inventor: Joachim Kleiss, Dettelbach, Fed. Rep. of Germany

[73] Assignee: Fulgeritwerke Seelze und Eichriede in Luthe bei Hannover Adolf Oesterheld GmbH & Co. Kommanditgesellschaft, Wunstorf, Fed. Rep. of Germany

[21] Appl. No.: 260,407

[22] Filed: May 4, 1981

[51] Int. Cl.$^3$ .......................... B32B 1/08; B32B 1/10; B32B 3/30; B32B 15/08

[52] U.S. Cl. .................................. 428/188; 52/309.7; 52/309.16; 52/656; 428/159; 428/317.7; 428/319.1; 156/313

[58] Field of Search ................. 428/34, 159, 160, 164, 428/174, 310, 313, 315, 460, 425.3, 425.8, 188, 317.1, 317.7, 319.1; 264/45.5; 52/656, 309.7, 309.16, 399, 730, 732, 790; 156/313.3

[56] References Cited

U.S. PATENT DOCUMENTS

| | | | |
|---|---|---|---|
| 4,113,905 | 9/1978 | Kessler | 428/313 |
| 4,130,976 | 12/1978 | Kessler et al. | 264/45.5 |
| 4,275,099 | 6/1981 | Dani | 428/458 |

Primary Examiner—William J. Van Balen
Attorney, Agent, or Firm—Wells & Wells

[57] ABSTRACT

A primer is provided as a bonding base in an extruded hollow aluminum shape ensheathed by a polyurethane foam. Due to the different coefficients of expansion between the plastic and the aluminum, changes in length take place, which cannot be adequately prevented using the known primers.

The invention therefore solves the problem to widely prevent the shrinkage of the plastic sheath and simultaneously to provide a way of depositing the primer in a simple manner.

This problem is solved by the invention in that the primer is a compound of resin, pigment and acid. The purpose of the acid is to cause the bonding reaction with the metal substrate, whereas the pigments on one hand cause the bonding reaction with the plastic sheath and on the other hand are used to ascertain the apparent film thickness.

An improvement in adhesion of 1,000% is surprisingly achieved when using such a primer.

11 Claims, 1 Drawing Figure

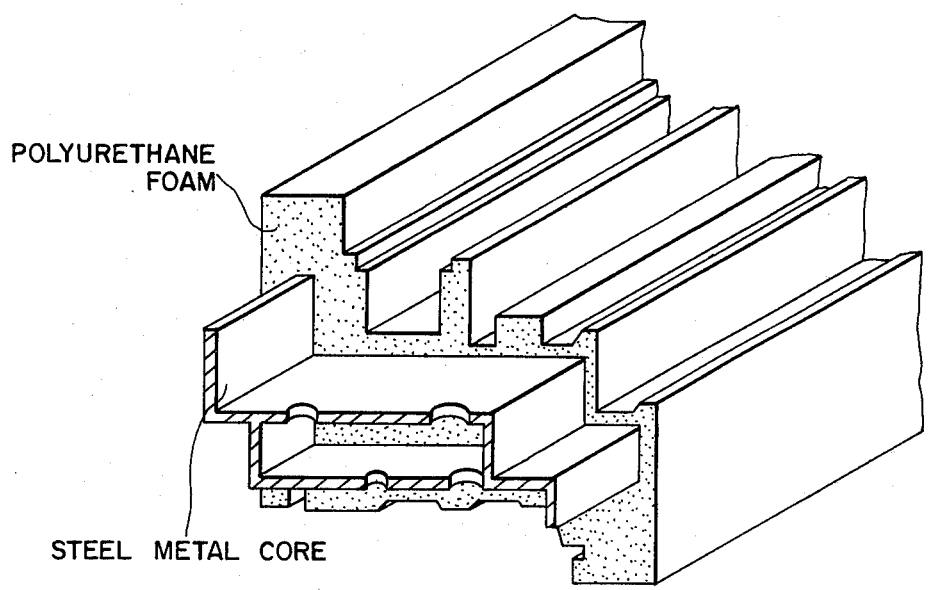

SHAPES FOR WINDOWS OR DOORS

The invention concerns a shape for windows or doors, consisting of a hollow aluminum extrusion with a polyurethane foam plastic sheathing, a primer being provided as a bonding means for the polyurethane foam between the surface of the aluminum shape and the plastic foam.

In known shapes of this kind, the primer consists of an aqueous polyurethane dispersion with an additive of a silicon-based reactive component which by means of film-formation in the course of the evaporation of the water provides bonding to the metal substrate.

This known arrangement suffers from the drawback that the above cited primer cannot be injection-molded, whereby its deposition becomes labor-intensive and complex. The immersion process has been found the most efficient to deposit this primer, but it also suffers from the drawback that for reasons of spatial compactness the initial shape-rods, which are about six meters long, must be stood up erect after the immersion so that the excess primer will drain. As a result, there is an uneven primer thickness along the length of the rod.

Another shortcoming is that the known primer is a relatively poor bonding agent so that by means of this primer alone the different lengths taking place on account of different coefficients of expansion between the plastic and the aluminum and causing the "growing out" of the aluminum shape due to the shrinking of the plastic sheath cannot be sufficiently prevented.

It is therefore the object of the invention to create a shape of the initially cited kind for which the shrinkage of the plastic sheath will be extensively prevented and which can be manufactured in a simple manner.

This problem is solved by the primer being a compound of resin, pigment and acid.

The purpose of the acid is to cause the bonding reaction with the metal substrate, while the pigments on one hand are meant to cause the bonding reaction with the plastic sheath and on the other hand are used to ascertain the apparent film thickness.

Advantageously the resin will be phenolic resin, whereas the pigments are zinc compounds and the acid is phosphoric acid. The phenolic resin can be combined with polyvinylbutyral or be replaced by it. It is especially advantageous that the primer's composition be as follows:

BRIEF DESCRIPTION OF THE DRAWING

The FIGURE illustrates the application of the primer of the present invention to window or door shapes comprising a metal core made of steel and enclosed by a plastic foam made of polyurethane foam.

EXAMPLE

8% polyvinylbutyral
4.5% phenolic resin
1.5% anti-setting agent
50% (monovalent) alcohol
16% aromatics
3% extender
9% activated pigments
6% inert pigments
1.5% phosphoric acid (85%)
0.5% distilled water.

In the above example, the active pigments can be zinc chromate, preferably zinc tetraoxichromate or zinc phosphate, whereas the inert pigments are titanium dioxide or iron oxide and the aromatics isopropyl alcohol.

Using zinc chromate or zinc phosphate depends on the particular application, as zinc chromate is part of the dangerous substances.

The anti-setting agents cited above in the example may be coagulants to prevent settling, for instance bentonides. The extenders are fillers, for instance micro-talcum and/or mica.

Using isopropylalcohol offers the advantage that the compound dries rapidly. However it also entails the drawback that its non-combustibility is not assured. If non-combustibility is to be achieved, the aromatics advantageously are replaced by water. In this manner a dispersion is formed which will dry more slowly but offers the advantage of non-combustibility.

When using such a primer, one obtains in surprising manner that an improvement of a thousand percent in adhesion as determined by the test method described below.

In this manner it becomes possible to so manufacture the shapes of the invention that the subsequent corner joints require little finishing work or none at all. The windows or doors made from the shapes of the invention moreover can be subjected to substantially larger temperature variations and corresponding permanent loads without thereby disadvantageously changing their shapes, or without thereby gaps and cracks taking place in the region of the corner joints.

Another advantage offered by the invention is that the shapes of the invention can be manufactured far more simply and more cleanly and hence more precisely than shapes of the known kind, because the primer of the invention, contrary to what is the case for the known primer, can be injection-molded. There results thereby the further advantage that a pass-through injection molding system can be set up which provides the aluminum bars passing through with a primer in a wholly uniform manner.

Comprehensive experiments were required to develop the above cited primer. These experiments consisted in foaming around the aluminum shapes provided with the various bonding agents and/or also with different surface structures, whereupon ten-centimeter long sections were cut off the finished shapes to be thereupon subjected to various temperature and hydrolysis stresses by treatment with steam at 100° C. (373 Kelvin). Moreover temperature loads in the cold range down to $-40°$ C. (233 Kelvin) were performed in a cold chamber.

After application of the various temperature loads, the particular shrinkages of the plastic sheath, i.e. the retraction of the polyurethane foam with respect to the aluminum core, were measured at room temperature on one side of the test pieces. After a given number of test cycles, there resulted for the aluminum shapes provided with the known primers and with a smooth surface a change in length from 0.3 to 0.4 mm on each side of the test piece of the aluminum shape. When treating the same smooth-surface aluminum shape using the primer of the invention and the same foam cross-sections, the same test conditions resulted in a change in length due to retraction of the plastic foam of 0.03 to 0.04 mm on both sides, so that in this manner a bonding improvement in the ratio of 10/1 is obtained in the favor of the approach of the invention.

The above tests moreover were carried out with other primers, which however performed even more poorly than the above cited known primer.

Lastly the experiments were supplemented by various treatments on the aluminum surfaces, increasing the surface roughness; as a result the absolute adhesion was improved but the relations between the effects from the two primers remained unaffected.

As shown by further experimentation, the primer of the invention also may be applied equally advantageously to shapes with steel cores. A steel core is three times more advantageous than an aluminum core with respect to its coefficient of expansion as it affects the plastic sheath.

I claim:

1. In a shape for windows and doors consisting of a hollow aluminum extruded shape with a plastic sheath made of polyurethane foam and having a primer consisting of an adhesive substrate between the surface of said aluminum shape and said polyurethane foam, the improvement comprising said primer consisting of a compound of a resin selected from the group consisting of phenolic resin, polyvinylbutyral or a mixture thereof; pigment and acid.

2. The shape of claim 1, wherein said resin is phenolic resin, said pigment is a compound of zinc and said acid is phophoric acid.

3. The shape of claim 1, wherein said resin is polyvinylbutyral, said pigment is a compound of zinc and said acid is phosphoric acid.

4. The shape of claim 1, wherein said resin is a mixture of polyvinylbutyral and phenolic resin, said pigment is a compound of zinc and said acid is phosphoric acid.

5. The shape of claim 1, wherein said compound consists of:
   8% polyvinylbutyral;
   4.5% phenolic resin;
   1.5% anti-setting agent;
   50% (monovalent) alcohol;
   16% aromatics;
   3% extender;
   9% active pigments;
   6% inert pigments;
   1.5% (85%) phosphoric acid; and
   0.5% distilled water.

6. The shape of claim 5, wherein said active pigments are selected from the group consisting of zinc chromate, zinc tetraoxichromate and zinc phosphate; said inert pigments are selected from the group consisting of titanium dioxide and iron oxide and said aromatics are isopropyl alcohol.

7. The shape of claim 1, wherein said compound consists of:
   8% polyvinylbutyral;
   4.5% phenolic resin;
   1.5% anti-setting agent;
   50% (monovalent) alcohol;
   3% extender
   9% active pigments;
   6% inert pigments;
   1.5% (85%) phosphoric acid; and
   16.5% distilled water.

8. In a method of preparing a shape for windows and doors consisting of a hollow aluminum extruded shape with a plastic sheath made of polyurethane foam and having a primer conisting of an adhesive substrate between the surface of said aluminum shape and said polyurethane foam, the improvement comprising applying as said primer a compound of a resin selected from the group consisting of phenolic resin, polyvinylbutyral or a mixture thereof; pigment and acid.

9. The method of claim 8, wherein said resin is phenolic resin, said pigment is a compound of zinc and said acid is phosphoric acid.

10. The method of claim 8, wherein said resin is polyvinylbutyral, said pigment is a compound of zinc and said acid is phosphoric acid.

11. The method of claim 8, wherein said resin is a mixture of polyvinylbutyral and phenolic resin, said pigment is a compound of zinc and said acid is phosphoric acid.

* * * * *